United States Patent [19]

Satyamurti et al.

[11] Patent Number: 5,699,404
[45] Date of Patent: Dec. 16, 1997

[54] APPARATUS FOR TIME-SCALING IN COMMUNICATION PRODUCTS

[75] Inventors: Sunil Satyamurti, Delray Beach; Salvador Sibecas, Lake Worth, both of Fla.

[73] Assignee: Motorola, Inc., Schaumburg, Ill.

[21] Appl. No.: 494,662

[22] Filed: Jun. 26, 1995

[51] Int. Cl.$^6$ .............................. H04M 11/00; G10L 3/02
[52] U.S. Cl. ............................................. 379/57; 395/2.2
[58] Field of Search .................... 379/57, 63; 455/72; 395/2.2, 2.16, 2.31, 2.35, 2.81, 2.28, 2.18

[56] References Cited

U.S. PATENT DOCUMENTS

| | | | |
|---|---|---|---|
| 4,701,943 | 10/1987 | Davis et al. | |
| 4,769,642 | 9/1988 | Davis et al. | |
| 4,811,376 | 3/1989 | Davis et al. | |
| 5,216,744 | 6/1993 | Alleyne et al. | 395/2.09 |
| 5,353,374 | 10/1994 | Wilson et al. | 395/2.35 |

OTHER PUBLICATIONS

Lawrence R. Rabiner, *On Creating Reference Templates for Speaker Independent Recognition of Isolated Words*, IEEE Transactions on Acoustics, Speech and Signal Processing, vol. ASSP-26, No. 1, Feb. 1978, pp. 34–41.

Atal and Schroeder, *Predictive Coding of Speech Signals and Subjective Error Criteria*, IEEE Transactions on Acoustics, Speech and Signal Processing, vol. ASSP-27, No. 3, Jun. 1979, pp. 247–254.

*Primary Examiner*—Curtis Kuntz
*Assistant Examiner*—Scott Richardson
*Attorney, Agent, or Firm*—Philip P. Macnak; Pablo Meles

[57] ABSTRACT

A communication system using voice compression includes a transmitter base station (113) and a selective call receiver (112). The transmitter base station (113) includes an input device (204) to receive an audio voice message which is stored in a memory (209). A processing device (208) digitizes the audio voice message to provide an input signal which is divided into a sequence of equivalent time frames, and differences in a short-term frequency spectrum between adjacent time frames is determined to derive distance measurements. A speed factor is computed as an average of the distance measurements, and the input signal is time-scales in accordance with the speed factor and then transmitted by a transmitter (102). The selective call receiver (112) includes a receiver (105) which receives the time-scaled signal, a processing device (115, 106) which demodulates and expands the time-scaled signal in accordance with the speed factor to provide a reconstructed signal which is amplified by an amplifier (108) into an audio signal.

9 Claims, 5 Drawing Sheets

APPARATUS FOR TIME-SCALING IN COMMUNICATION PRODUCTS

TECHNICAL FIELD

This invention relates generally to time scaling techniques, and more particularly to a method and apparatus for improved time scaling utilizing a speed factor derived from an input signal.

BACKGROUND

Time-scaling methods are used to compress and expand input signals, in particular, speech input signals. Further, time-scaling techniques when used with communication systems allow for a more bandwidth efficient system than other techniques. Time-scaling of voice signals also generally presents tradeoffs between voice compression ratios and speech quality upon reconstruction. Existing time-scaling techniques have failed to fully consider that different speakers talk at different rates or speeds. Thus, using existing techniques, speech of faster speakers might be compressed too much and thus provide lower quality reconstructed speech and speech of slower speakers would not be compressed enough, thus causing inefficient compression. Also, certain applications like dictation and sound editing require that all messages be played at the same speed irrespective of how fast or slow a person speaks. These devices would benefit from use of a speed factor as an input to a time-scale modification algorithm and further use the speed factor to equalize the rate of speech.

With respect to the aspect of paging involving time-scaling of voice signals and to other applications such as dictation and voice mail, current methods of time-scaling lack the ideal combinations of providing adequate speech quality and flexibility that allows a designer to optimize the application within the constraints given. Thus, there exists a need for a voice communication system that is economically feasible and flexible in allowing optimization within a given configuration, and more particularly with respect to paging applications, that further retains many of the advantages of Motorola's high speed paging protocols.

SUMMARY OF THE INVENTION

In accordance with a first aspect of the present invention, a communication system using voice compression has at least one transmitter base station and a plurality of selective call receivers. The at least one transmitter base station comprises an input device which receives an audio voice message; a memory which stores the audio voice message; a processing device which digitizes the audio voice message to provide an input signal for analysis, divides the input signal into a sequence of equivalent time frames, for determining differences in a short-term frequency spectrum between adjacent time frames to derive a sequence of distance measurements, computes a first speed factor as an average of the sequence of distance measurements, and time-scales the input signal in accordance with the first speed factor to provide a time-scaled signal; and a transmitter which transmits the time-scaled signal The plurality of selective call receivers comprise a selective call receiver which receives the time-scaled signal, a processing device which demodulates and expands the time-scaled signal in accordance with the first speed factor to provide a reconstructed signal, and an amplifier which amplifies the reconstructed signal into a reconstructed audio signal.

In accordance with a second aspect of the present invention, a transmitting base station comprises an input device which receives an audio voice message; a memory which stores the audio voice message; a processing device which digitizes the audio voice message to provide an input signal for analysis, divides the input signal into a sequence of equivalent time frames, determines differences in a short-term frequency spectrum between adjacent time frames to derive a sequence of distance measurements, computes a first speed factor as an average of the sequence of distance measurements, and time-scales the input signal in accordance with the first speed factor to provide a time-scaled signal; and a transmitter which transmits the time-scaled signal.

DETAILED DESCRIPTION OF THE PREFERRED EMBODIMENT

The present invention provides a method to detect whether a speaker is speaking fast or slow and come up with an optimal compression factor to provide a certain quality of reconstructed speech when used with time-scaling techniques. There are several parameters or factors that could be used to determine how fast or how slow a speaker is speaking. The first one is the rate at which the short-term frequency spectrum changes in the speech. The second parameter or factor is the lengths of pauses between words. These two factors are used to determine a speed factor which determines how fast or slow a speaker talks. Optionally, a third factor would be the approximate pitch determined from a particular speaker to improve the accuracy of the speed factor.

The system comprises of digitizing speech and then preferably dividing them up into frames of 20 ms. Linear Predictive Analysis (LPC analysis) is performed on each frame of speech and the difference in the short-term frequency spectrum between adjacent blocks is determined by using the Itakura distance measure D which is represented by the formula:

$$D = \log\left(\frac{(R)(a)}{(R)(b)}\right) \text{ where}$$

"R" is the Auto-correlation matrix related to a frame n, "a" is the LPC vector related to frame n and "b" is the LPC vector related to frame n+1. D is the distance measure between frame n and n+1. The larger the distance D the greater the difference in frequencies between adjacent frames. An overall average measure of distance is then calculated for the whole speech sentence. This gives a measure of the speed factor.

Next the energy and zero crossings are measured for each frame and silence periods are detected. The percentage of silence periods in the speech sentence gives another measure of the speed factor. These two parameters (and optionally, a pitch estimation parameter) are used to then determine the right compression factor that needs to be used along with time-scaling techniques so as to achieve a given quality of reconstructed speech.

A brief description of a sample pitch estimation procedure is given below.
1) Frame input speech into 20 ms blocks.
2) Compute energy in each block.
3) Compute average energy per block.
4) Determine energy threshold to detect voiced speech as a function of the average energy per block.
5) Using the energy threshold determine contiguous blocks of voiced speech of a length of at least 5 blocks.
6) On each block of the contiguous voice speech found in step 5, do a pitch analysis. This could be done using a variety of methods including Modified Auto correlation method, AMDF or Clipped auto correlation method.
7) The pitch values are smoothened using a median filter to eliminate errors in the estimation.
8) Average all the smoothened pitch values to obtain an approximate estimate of the speaker's pitch.

A sampling rate of 8 Khz is assumed in all cases above although other sampling rates and other methods of pitch estimation are contemplated within the present invention.

Figure 3:
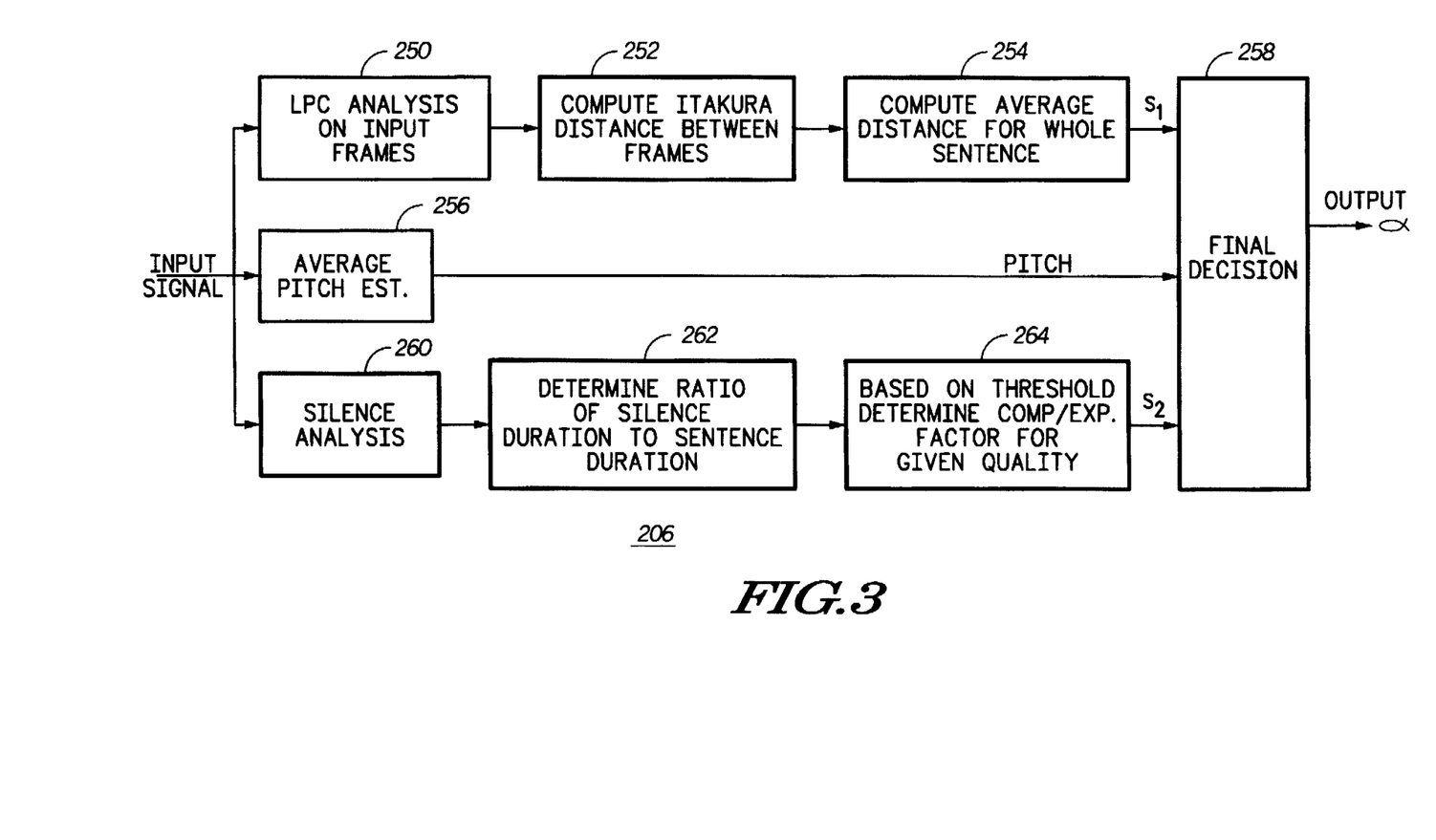
FIG. 3 is an expanded electrical block diagram of a time-scaling analyzer in accordance with the present invention.

As will be shown with respect to FIG. 3, $S_1$ and $S_2$ are the speed factors determined using the Itakura distance measure D and silence periods respectively. They are in turn (optionally, along with the pitch estimate) used to determine the final compression and expansion factor $\alpha$. Thus, the Itakura distance measure and Silence period are used to determine the speed factor for a given speech sentence and further used to compute an optimum compression/expansion factor for a given quality of reconstructed speech.

Figure 1:
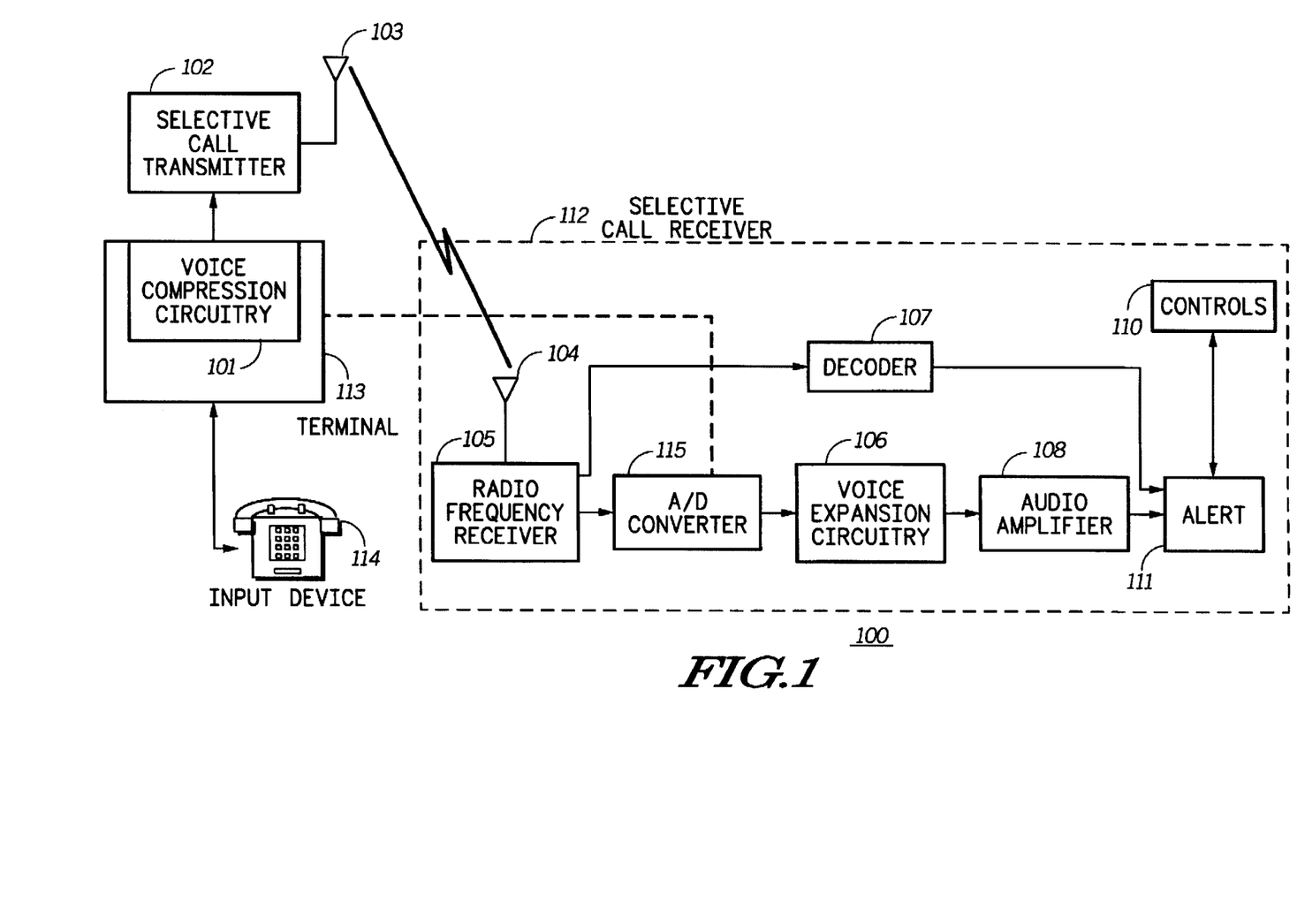
FIG. 1 is a block diagram of a voice communication system in accordance with the present invention.

Referring to FIG. 1, a communication system illustrative of the voice compression and expansion techniques of the present invention are shown in a block diagram of the selective call system 100 which comprises an input device for receiving an audio signal such as telephone 114 from which voice based Selective calls are initiated for transmission to selective call receivers in the system 100. Each selective call entered through the telephone 114 (or other input device such as a computer) typically comprises (a) a receiver address of at least one of the selective call receivers in the system and (b) a voice message. The initiated selective calls are typically provided to a transmitter base station or a selective call terminal 113 for formatting and queuing. Voice compression circuitry 101 of the terminal 113 serves to compress the time length of the provided voice message (the detailed operation of such voice compression circuitry 101 is further discussed in the following description of FIGS. 2–5). Preferably, the voice compression circuitry 101 includes a processing device for compressing the audio signal using a time-scaling technique and a single sideband modulation technique to provide a processed signal, although other modulation techniques are contemplated for use in the present invention. The selective call is then input to the selective call transmitter 102 where it is applied as modulation to a radio frequency signal which is sent along with a time-scale factor over the air through an antenna 103. Preferably, the transmitter is a quadrature amplitude modulation transmitter for transmitting the processed signal, although other transmitters are contemplated for use in the present invention.

An antenna 104 within a selective call receiver 112 receives the modulated, transmitted radio frequency signal and inputs it to a selective call receiver module or radio frequency receiver module 105 for receiving the processed signal or radio frequency signal, where the radio frequency signal is demodulated and the receiver address and the single side band (QAM) signal are recovered. This signal is then provided to an analog to digital converter (A/D) 115. Preferably, the selective call receiver 112 includes a processing device for demodulating the received processed signal using a single sideband demodulation technique and a time-scaling expansion technique to provide a reconstructed signal. The compressed voice message is then provided to a voice expansion circuit 106 where the time length of the voice message is preferably expanded to the desired value. The voice message is then provided to a digital-to-analog converter (not shown) and an amplifier such as audio amplifier 108 for the purpose of amplifying it to a reconstructed audio signal.

The demodulated receiver address and the time-scale factor are supplied from the radio frequency receiver 105 to a decoder 107. If the receiver address matches any of the receiver addresses stored in the decoder 107, an alert 111 is optionally activated, providing a brief sensory indication to the user of the selective call receiver 112 that a selective call has been received; The brief sensory indication may comprise an audible signal, a tactile signal such as a vibration, or a visual signal such as a light, or a combination thereof. The amplified voice message is then furnished from the audio amplifier 108 to an audio loudspeaker within the alert 111 for message announcement and review by the user.

The decoder 107 may comprise a memory in which the received voice messages can be stored and recalled repeatedly for review by actuation of one or more controls 110.

In another aspect of the invention, portions of FIG. 1 can be equally interpreted as part of a dictation device, voice mail system, answering machine, or sound track editing device for example. By removing the wireless aspects of the system 100 including the removal of selective call transmitter 102 and radio frequency receiver 105, the system can be optionally hardwired from the voice compression circuitry 101 to the voice expansion circuitry 106 through the A/D 115 as shown with the dashed line. Thus, in a voice mail, answering machine, sound track editing or dictation system, an input device 114 would supply an acoustic input signal such as a speech signal to the terminal 113 having the voice compression circuitry 101. The voice expansion circuitry 106 and controls 110 would supply the means of listening and manipulating to the output speech signal in a voice mail, answering machine, dictation, sound track editing or other applicable system. This invention clearly contemplates that the time-scaling techniques of the claimed invention has many other applications besides paging. The paging example disclosed herein is merely illustrative of one of those applications.

Figure 2:
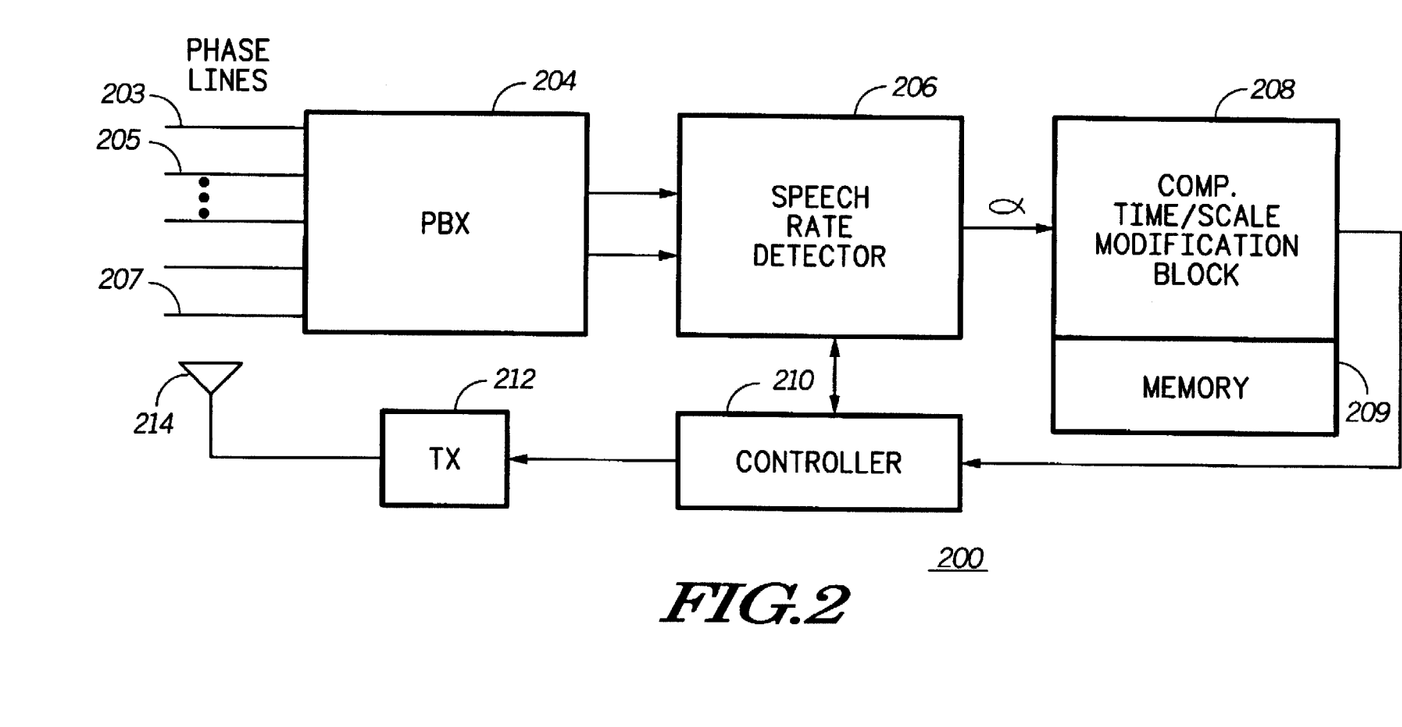
FIG. 2 is a block diagram of a base station transmitter in accordance with the present invention.

Referring to FIG. 2, the base station and transmitting portion 200 of the present invention is shown in FIG. 2. In operation, incoming voice messages are received via telephone line inputs 203, 205, 207, are processed by standard telephone-line interface circuits 202 (preferably including a PBX system) and then temporarily recorded, either on tape or in an electronic memory, i.e., in a buffer memory. The standard telephone interface and buffer memory portions in block 202 are referred to as a voice store and forward system and is described in detail in Motorola Instruction Manual No. 68P81105C25, entitled, "Voice Store and Forward Modax Plus/Metro-Page".

Then, the messages are retrieved from the buffer memory within block 202 and are processed by the speech detector block 206 which preferably includes LPC analysis circuits that analyze the voice signal and generate the digital LPC parameters that correspond to the input voice signal.

The speech rate detector 206 computes and provides a time scaling factor α to a Compression Time Scaling Block 208 which compresses the input speech signal in accordance with the time scaling factor. The Block 208 is coupled to the controller 210 and may optionally include memory block 209.

In speech system of the present invention, the intent is to provide a technique in which several speech messages can be transmitted in the time presently required to transmit one message while minimizing the affects on speech quality.

As mentioned above, the speech signals from the phone line inputs 203, 205, and 207 are stored temporarily in a storage memory within block 202. This is done to handle high peak input loads without requiring a large number of expensive analyzers. The stored voice samples are retrieved from the memory under the direction of the controller 210 which, in practice can be a microcomputer.

FIG. 3 illustrates a further detailed block diagram of the speech rate detector 206 of FIG. 2. The speech rate detector 206 preferably comprises several analysis steps that ultimately results in more efficient compression or expansion with an optimal level of desired speech quality. The detector 206 preferably comprises an LPC analyzer 250 that provides an LPC analysis on the input frames of the input signal. Preferably, as previously discussed, the input signal is digitized and divided into frames of 20 milliseconds and stored in a memory (see memory 209, FIG. 2). At block 252, the Itakura distance measure D is determined between frames. In Block 254, the average distance using the distance D from each frame for a whole speech signal (for example, from an entire sentence comprising a message), is computed preferably from one source or speaker. As a result of the average distance computed and determining a difference in the short-term frequency spectrum between adjacent time frames in block 254, an overall distance measure and as a result a first speed factor $S_1$ is provided to the final decision block 258. The final decision block 258 can thus provide a time-scale factor α to appropriately compress (or expand) the input speech signal in accordance with the time-scaling factor. Depending on the pitch estimate of the speaker, the Itakura distances can be used to compress voice input signals in accordance with the following chart:

| ITAKURA DISTANCE RANGE | | |
|---|---|---|
| *Pitch < 40 samples | *Pitch > 40 Samples | COMPRESSION RATE |
| −0.4 to −0.45 | <−0.3 | 4 |
| −0.45 to −0.5 | −0.35 to −0.4 | 3.5 |
| −0.5 to −0.55 | −0.4 to −0.45 | 3.25 |
| <−0.55 | −0.45 to −0.5 | 3 |
| | <−0.5 | 2.5 |

*Samples at 8 kilohertz sampling rate.

The values above can vary for optimization in different systems. Such factors as language, number of users, the ratio between genders among users of a system could be some of the many factors that may be used to alter the figures in the chart above to provide an optimum system.

Further refinement of the method can be achieved using a second speed factor $S_2$ by performing a silence analysis at block 260. In other words, the energy and zero crossings are measured for each frame and using this, silence periods are detected. In block 262, the percentage of silence periods in the speech input signal thus provides another measure and a second speed factor $S_2$ which is computed in block 264.

Therefore, in view of the graph above, if the silence is less than 10%, you can reduce the compression rate by 0.25. The value actually obtained from block 264 may be adjusted based on the level of quality of speech desired. Therefore, in this instance, the two speed factors $S_1$ and $S_2$ are provided to decision block 258 and used to then determine the right overall compression (or expansion) factor that needs to be used along with time-scaling techniques to achieve a given quality of reconstructed speech. Additionally, the present invention can optionally determine an average pitch estimate in block 256 to provide another factor to the decision block 258, allowing for further refinement in the decision to compress without audibly affecting the desired optimum quality of resultant speech. Average pitch estimates in this instance will aid in determining whether a male or female speaker is providing the input signal. This knowledge in combination with the previously determined speed factor will provide a time-scale factor which is used to obtain optimum quality reconstructed speech.

Figure 4:
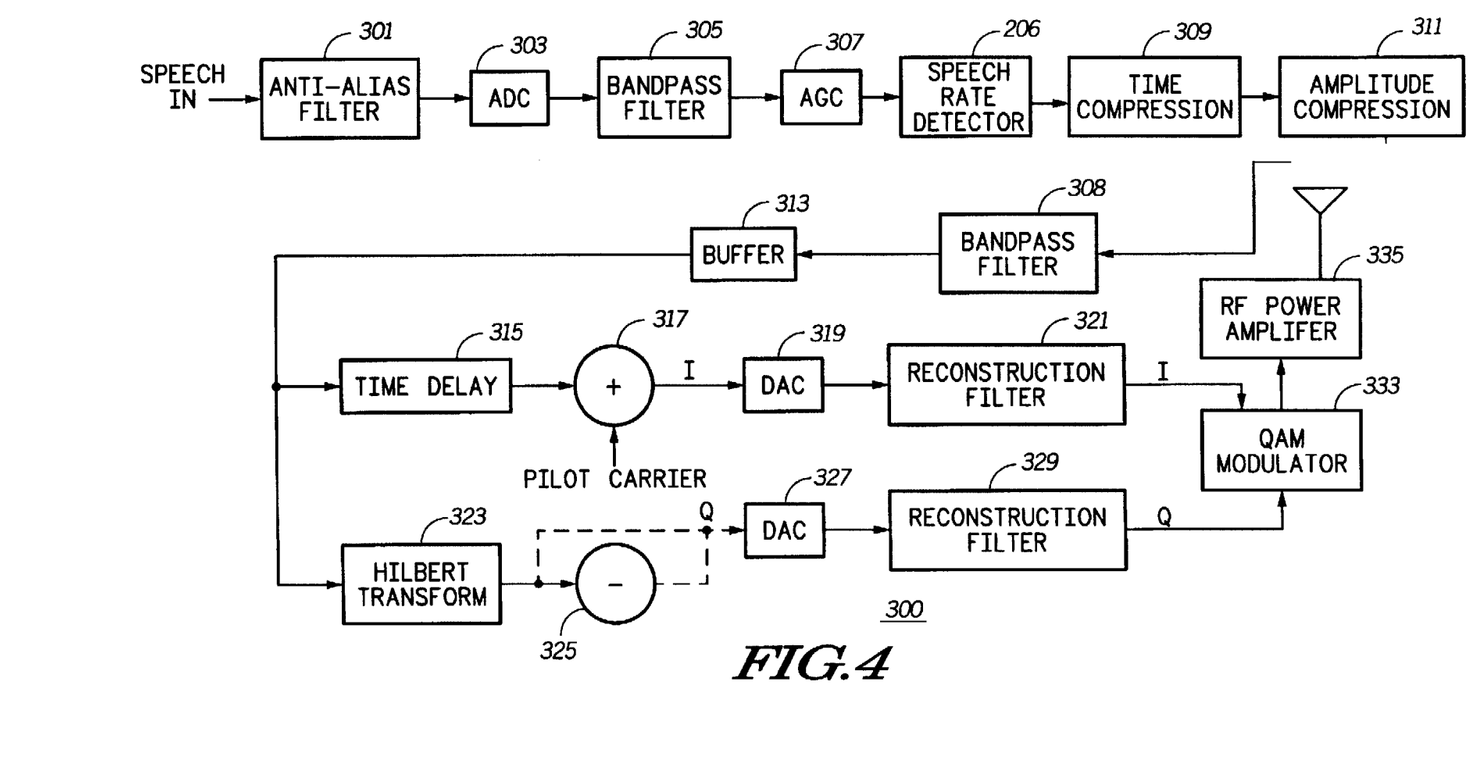
FIG. 4 is an expanded electrical block diagram of the base station transmitter in accordance with the present invention.

FIG. 4 illustrates a block diagram of a first embodiment of a transmitter 300 in accordance with the present invention. An analog speech signal is input to an anti-aliasing low pass filter 301 which strongly attenuates all frequencies above one-half the sampling rate of an analog-to-digital converter (ADC) 303 which is further coupled to the filter 301. The ADC 303 preferably converts the analog speech signal to a digital signal so theft further signal processing can be done using digital processing techniques. Digital processing is the preferred method, but the same functions could also be performed with analog techniques or a combination of analog and digital techniques.

A band pass filter 305 coupled to the ADC 303 strongly attenuates frequencies below and above its cutoff frequencies. The lower cutoff frequency is preferably 300 Hz which allows the significant speech frequencies to pass, but attenuates lower frequencies which would interfere with a pilot carrier. The upper cutoff frequency is preferably 2800 Hz which allows the significant speech frequencies to pass but attenuates higher frequencies which would interfere with adjacent transmission channels. An automatic gain control (AGC) block 307 preferably coupled to the filter 305 equalizes the volume level of different voices. The block 307 then provides a signal to the speech rate detector block 206, which operates as previously described with regard to FIG. 3 to provide a time-scaling factor to the time compression block 309.

The time compression block 309 preferably coupled to the AGC block 307 shortens the time required for transmission of the speech signal while maintaining essentially the same signal spectrum as at the output of the bandpass filter 305. The time compression method is preferably WSOLA-SD (as explained in U.S. patent application Ser. No. 08/395,739), but other methods could be used. An amplitude compression block 311, and the corresponding amplitude expansion block in a receiver (not shown), form a companding device which is well known to increase the apparent signal-to-noise ratio of the received speech. The companding ratio is preferably 2 to 1 in decibels, but other ratios could be used in accordance with the present invention. In the particular instance of a communication system such as a paging system, the devices 301–309 may be included in a paging terminal (113 of FIG. 1) and the remaining components in FIG. 4 could constitute a paging transmitter (102 of FIG. 1). In such a case, there would typically be a digital link between the paging terminal and paging transmitter. For instance, the signal after block 309 could be encoded using a pulse code modulation (PCM) technique and then subsequently decoded using PCM to reduce the number of bits transferred between the paging terminal and paging transmitter.

In any event; a second band pass filter 308 coupled to the amplitude compression block 311 strongly attenuates frequencies below and above its cutoff frequencies to remove any spurious frequency components generated by the AGC 307, the time compression block 309 or the amplitude compression block 311. The lower cutoff frequency is preferably 300 Hz which allows the significant speech frequencies to pass, but attenuates lower frequencies which would interfere with the pilot carrier. The upper cutoff frequency is preferably 2800 Hz which allows the significant speech frequencies to pass but attenuates higher frequencies which would interfere with adjacent transmission channels.

The time compressed speech samples are preferably stored in a buffer 313 until an entire speech message has been processed. This allows the time compressed speech message to then be transmitted as a whole. This buffering method is preferably used for paging service (which is typically a non real time service). Other buffering methods may be preferable for other applications. For example, for an application involving two-way real time conversation, the delay caused by this type of buffering could be intolerable. In that case it would be preferable to interleave small segments of several conversations. For example, if the time compression ratio is 3:1, then 3 real time speech signals could be transmitted via a single channel. The 3 transmissions could be interleaved on the channel in 150 millisecond bursts and the resulting delays would not be objectionable. The time compressed speech signal from the buffer 313 is applied both to a Hilbert transform filter 323 and to a time delay block 315 which has the same delay as the Hilbert transform filter, but does not otherwise affect the signal.

The output of the time delay block 315 (through the summing circuit 317) and the Hilbert transform filter 323 form, respectively, the in-phase (I) and quadrature (Q) components of an upper sideband (USB) single sideband (SSB) signal. The output of the time delay and the negative (325) of the Hilbert transform filter form, respectively, the in-phase (I) and quadrature (Q) components of a lower sideband (LSB) single sideband signal. Thus the transmission may be on either the upper or lower sideband, as indicated by the dotted connection.

While the upper sideband is used to transmit one time compressed speech signal, the lower sideband can be used to simultaneously transmit a second time compressed speech signal by using another similar transmitter operating on the lower sideband. SSB is the preferred modulation method because of efficient use of transmission bandwidth and resistance to crosstalk. Double sideband Amplitude Modulation (AM) or frequency modulation (FM) could be used, but would require at least twice the bandwidth for transmission. It is also possible to transmit one time compressed speech signal directly via the I component and a second time compressed speech signal directly via the Q component, however, in the present embodiment this method is subject to crosstalk between the two signals when multipath reception occurs at the receiver.

A direct current (DO) signal is added to the I component of the signal to generate the pilot carrier, which is transmitted along with the signal and used by the receiver to substantially cancel the effects of gain and phase variations or fading in the transmission channel. The I and Q components of the signal are converted to analog form by digital-to-analog converters (DAC) 319 and 327 respectively. The two signals are then filtered by low pass reconstruction filters 321 and 329 respectively to remove spurious frequency components resulting from the digital-to-analog conversion process. A quadrature amplitude modulation (QAM) modulator 333 modulates the I and Q signals onto a radio frequency (RF) carrier at low power level. Other modulation methods, e.g. direct digital synthesis of the modulated signal would accomplish the same purpose as the DACs (319 and 327), reconstruction filters (321 and 329), and QAM modulator 333. Finally, a linear RF power amplifier 335 amplifies the modulated RF signal to the desired power level, typically 50 watts or more. Then, the output of the RF power amplifier 335 is coupled to the transmitting antenna. Other variations can produce essentially the same results. For example, the amplitude compression could be performed before the time compression, or omitted altogether and the device would still perform essentially the same function.

Figure 5:
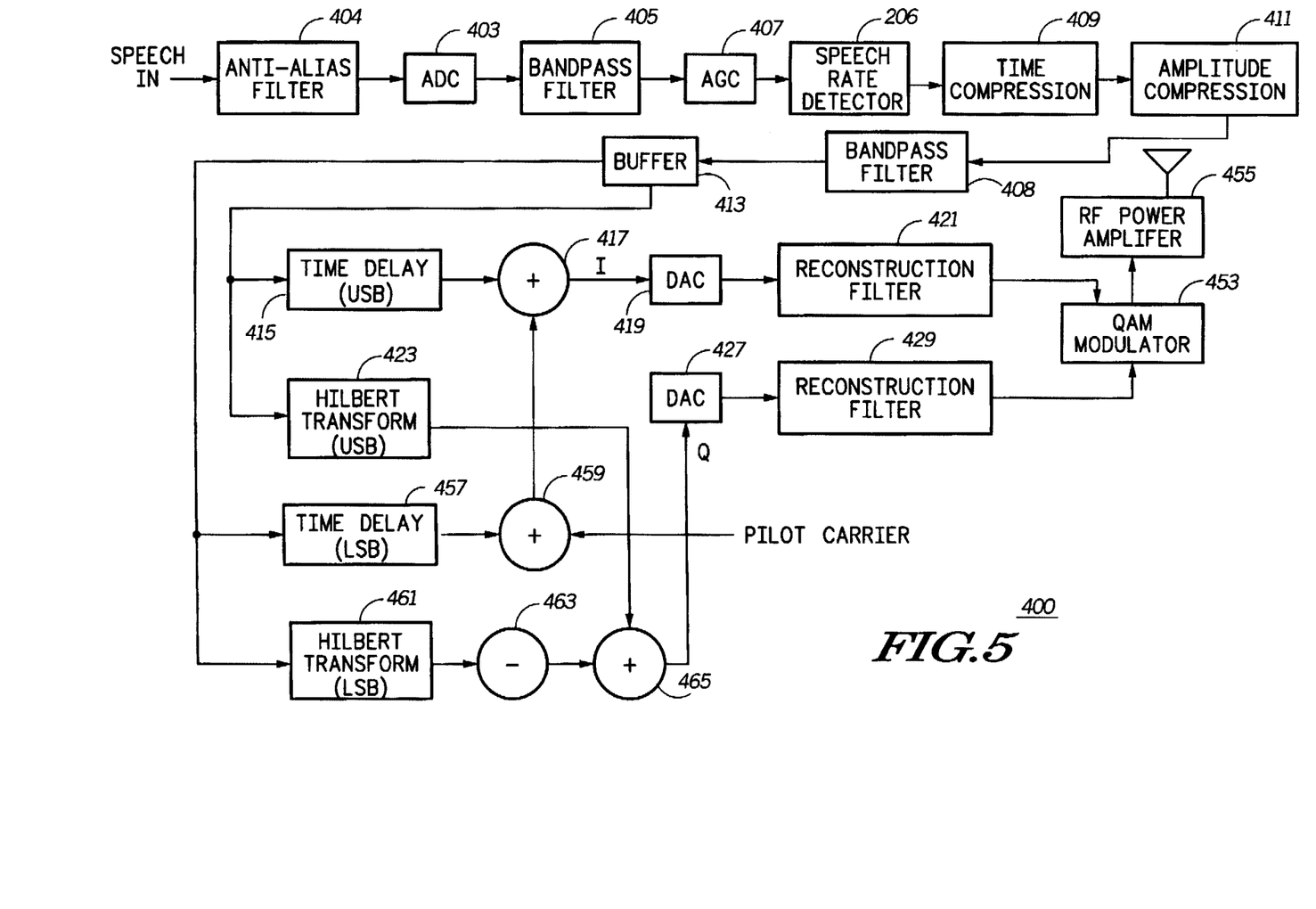
FIG. 5 is an expanded electrical block diagram of another base station transmitter in accordance with the present invention.

FIG. 5 illustrates a block diagram of a second embodiment of a transmitter 400 in accordance with the present invention. In FIG. 5, both the upper and lower sidebands are used to simultaneously transmit different portions of the same time compressed signal. The transmitter 400 preferably includes an anti-alias filter 404, an ADC 403, a bandpass filter 405, an AGC 407, a time compression block 409, an amplitude compression block 411, and a bandpass filter 408 coupled and configured as in FIG. 4. The block 407 provides a signal to the speech rate detector block 206, which operates as previously described with regard to FIG. 3 to provide a time-scaling factor to the time compression block 409. Operation of the transmitter of FIG. 4 is the same as in FIG. 3 until an entire speech message has been processed and stored in a buffer 413. The time compressed speech samples stored in the buffer 413 are then divided to be transmitted on either the upper or lower sideband. Preferably, the first half of the time compressed speech message is transmitted via one sideband and the second half of the time compressed speech message is transmitted via the other sideband (or alternatively on each of the I and Q components directly).

The first portion of time compressed speech signal from the buffer 413 is applied to both a first Hilbert transform filter 423 and to a first time delay block 415 which has the same delay as the Hilbert transform filter 423 but does not otherwise affect the signal. The output of the first time delay (through summing circuit 417) and the first Hilbert transform filter 423 (through summing circuit 465) are In-Phase (I) and Quadrature Phase (Q) signal components which, when coupled to I and Q inputs of the QAM modulator, generate upper sideband signal having information only from the first portion of time compressed speech samples. The second time compressed speech signal from the buffer 413 is applied to both a second Hilbert transform filter 461 and to a second time delay block 457 which has the same delay as the Hilbert transform filter 461 but does not otherwise affect the signal. The output of the second time delay (through summing circuits 459 and 417) and the negative (463) of the output of the second Hilbert transform filter 461 (and again, through summing circuit 465) are In-Phase (I) and Quadrature Phase (Q) signal components which, when coupled to I and Q inputs of the QAM modulator, generate upper sideband signal having information only from the second portion of time compressed speech samples. The I components of the upper and lower sideband signals are added with a DC pilot carrier component (through summing circuit 459) to form a composite I component for transmission. The Q components of the upper and lower sideband signals are added (through summing circuit 465) to form a composite Q component for transmission. It will be appreciated that elements 415, 423, 457, 461, 417, 459, 463, 465, 419, 427, 421, and 429 form a preprocessor which generates preprocessed I and Q signal components, which when coupled to the QAM modulator 453 generate the low level subchannel signal with a subcarrier $F_A$, having two single sideband signals which have independent information on each sideband.

The transmitter 400 further comprises DACs 419 and 427, reconstruction filters 421 and 429, QAM modulator 433, and RF power amplifier 455 arranged and constructed as described in FIG. 4. Operation of the rest of the transmitter of FIG. 5 is the same as in FIG. 4.

Preferably, in both transmitters 300 and 400 of FIGS. 4 and 5 respectively, only the anti-alias filters, the reconstruction filters, the RF power amplifier and optionally the Analog to Digital converter and digital to analog converters are separate hardware components. The remainder of the devices can preferably be incorporated into software which could be run on a processor, preferably a digital signal processor.

What is claimed is:

1. A communication system using voice compression having at least one transmitter base station and a plurality of selective call receivers, comprising:

at the at least one transmitter base station:

an input device for receiving an audio voice message;

memory for storing the audio voice message;

a first processing device for digitizing the audio voice message to provide an input signal for analysis, for dividing the input signal into a sequence of equivalent time frames, for determining differences in a short-term frequency spectrum between adjacent time frames to derive a sequence of distance measurements, computing a first speed factor as an average of the sequence of distance measurements, and for time-scaling the input signal in accordance with the first speed factor to provide a time-scaled signal;

a transmitter for transmitting the time-scaled signal;

at each of the plurality of selective call receivers:

a selective call receiver for receiving the time-scaled signal;

a second processing device for demodulating and expanding the time-scaled signal in accordance with the first speed factor to provide a reconstructed signal; and an amplifier for amplifying the reconstructed signal into a reconstructed audio signal.

2. The communication system of claim 1, wherein the processing device for digitizing the audio voice message further determines a percentage of silence periods within the input signal for analysis to provide a second speed factor and further time-scales the input signal in accordance with the first speed factor and the second speed factor.

3. The communication system of claim 1, wherein the processing device at the at least one transmitter base station determines the differences in the short-term frequency spectrum by performing linear predictive analysis on each of the sequence of equivalent time frames.

4. The communication system of claim 1, wherein the processing device in the at least one transmitter base station determines the differences in short-term frequency spectrum by using an Itakura distance measure D.

5. The communication system of claim 1, wherein the step of determining a percentage of silence periods comprises the steps of measuring energy and zero crossings for each of the sequence of equivalent time frames.

6. A transmitting base station comprising:

an input device for receiving an audio voice message;

memory for storing the audio voice message;

a processing device for digitizing the audio voice message to provide an input signal for analysis, for dividing the input signal into a sequence of equivalent time frames, for determining differences in a short-term frequency spectrum between adjacent time frames to derive a sequence of distance measurements, computing a first speed factor as an average of the sequence of distance measurements, and for time-scaling the input signal in accordance with the first speed factor to provide a time-scaled signal; and a transmitter for transmitting the time-scaled signal.

7. The transmitting base station of claim 6, wherein the processing device for digitizing the audio voice message further determines a percentage of silence periods within the input signal for analysis to provide a second speed factor and further time-scales the input signal in accordance with the first speed factor and the second speed factor.

8. The transmitting base station of claim 6, wherein the processing device determines the differences in short-term frequency spectrum by using an Itakura distance measure D.

9. The transmitting base station of claim 6, wherein the step of determining a percentage of silence periods comprises the steps of measuring energy and zero crossings for each of the sequence of equivalent time frames.

* * * * *